July 7, 1925.

J. L. BAILLE 1,544,794

DISTANCE INDICATING DEVICE FOR THE FOCUSING OF PHOTOGRAPHIC APPARATUS

Filed Oct. 30, 1922

Inventor
J. L. Baille,
By Marks & Clerk
Attys

Patented July 7, 1925.

1,544,794

UNITED STATES PATENT OFFICE.

JEAN LOUIS BAILLE, OF PARIS, FRANCE, ASSIGNOR TO BAILLE-LEMAIRE & FILS, OF PARIS, FRANCE, A COMPANY OF FRANCE.

DISTANCE-INDICATING DEVICE FOR THE FOCUSING OF PHOTOGRAPHIC APPARATUS.

Application filed October 30, 1922. Serial No. 597,985.

*To all whom it may concern:*

Be it known that I, JEAN LOUIS BAILLE, a citizen of the French Republic, residing 26 Rue Oberkampf, Paris, France, have invented new and useful Improvements in Distance-Indicating Devices for the Focusing of Photographic Apparatus, of which the following is the specification.

The present invention relates to improvements in distance indicating devices for the focusing of photographic apparatuses.

The said improvements are adapted to permit an easy reading of the digits of the graduation. For obtaining this result, it is obvious that the said graduation must be as long as possible, so as to increase the distance separating two successive lines of the scale; on the other hand, the space occupied by this graduation is limited by the dimensions of the photographic apparatus to which it is fitted.

The improvements forming the subject matter of the invention are characterized in that the graduation on distance read is traced on a circular scale, which turns about an axis passing through its center, so as to successively present all its points opposite a fixed pointer, the angular displacements of this scale being proportional to the rectilinear displacements of the slide carrying the objective.

The accompanying drawing illustrates, by way of example and diagrammatically, a form of construction of the invention.

Figure 1:
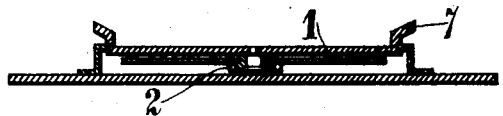
Fig. 1 is a sectional elevation of the whole of the device on the section line 1—1 of Fig. 3.
Figure 2:
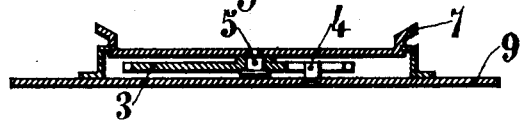
Fig. 2 is a similar section according to a different axis on the section line 2—2 of Fig. 3.
Figure 3:
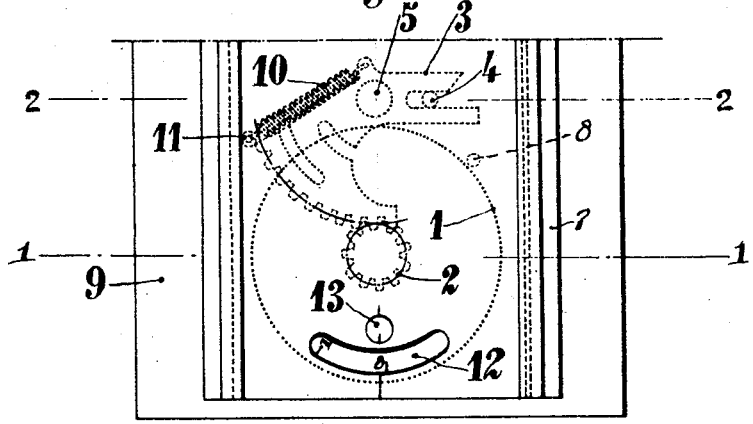
Fig. 3 is a plan view, the objective giving the image of an object at a close distance.
Figure 4:
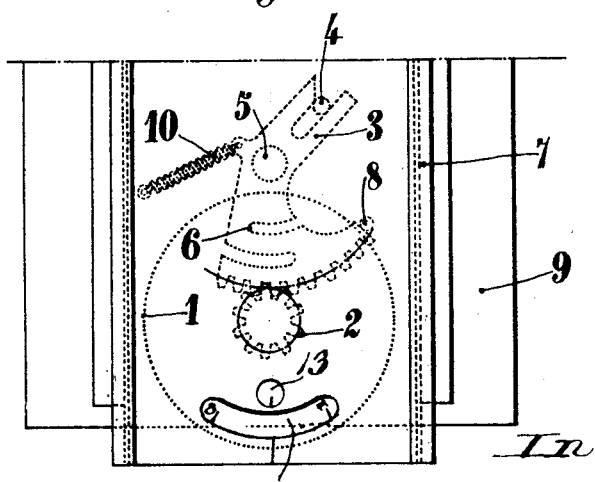

Fig. 4 is a plan view, the objective giving the image of an object at a close distance The focusing is effected by moving the slide 7 which supports the objective-carrying member. This slide carries a disc 1 integral with a pinion 2 which can be driven by a toothed segment 3, the axis of rotation 5 of which is also secured on the slide. One end of the toothed segment is provided with a slot in which fits a finger 4 secured on the folding top.

When the slide 7 moves, the segment 3, the end of which is retained by the finger 4, rotates about its axis 5; at each rectilinear elementary displacement of the slide 7 corresponds a proportional rotation of the segment 3 and consequently a rotation of the disc 1 amplified by the gear ratio.

The play of the gears is reduced by the provision of openings 6 in the toothed segment 3, which give to the same some resiliency and allow to press it so that its teeth intimately engage with those of the pinion. Moreover a spring 10, attached at one end to the slide and at the other to the segment 3, always tends to bring back the latter to the position it occupies in Fig. 4, the said segment being thus held against the abutment 8 when the slide is in a very forward position and when the finger 4 comes out of the slot in which it was fitted. This arrangement forces this finger 4 to come back in the slot when the slide is brought back to its primitive position.

The distances in meters are indicated on the disc and visible through the opening 12 provided in the slide 7, while the distances in feet are visible through the opening 13.

It is easy to see that the reading of the reference marks and digits on the disc is effected with great facility, these reference marks and digits capable of being well spaced apart owing to the length of the circular scale.

What I claim as my invention and desire to secure by Letters Patent is:

1. In a folding photographic apparatus, a slide, a slideway for the slide, a two branch lever pivoted on the slide, an abutment integral with the slideway and acting on one of the branches of the lever, a disc, rotatably mounted about a pin integral with the slide, means for transmitting the rotations of the lever to this disc, a graduation on the said disc, a reference mark on the slide.

2. In a folding photographic apparatus, a slide, a slideway for the slide, a two branch lever pivoted on the slide, an abutment integral with the slideway and acting on one of the branches of the lever, a disc, rotatably mounted about a pin integral with the slide, corresponding teeth on the disc and lever, a graduation on the said disc, readable through an opening in the slide.

3. In a folding photographic apparatus, a slide, a slideway for the slide, a two branch lever pivoted on the slide, an abutment integral with the slideway and acting on one of the branches of the lever, a disc, rotatably mounted about a pin integral with the slide, corresponding teeth on the disc and lever, a graduation on the said disc, readable through an opening in the slide, means for limiting the rotation of the lever.

4. In a folding photographic apparatus, a slide, a slideway for the slide, a two branch lever pivoted on the slide, an abutment integral with the slideway and acting on one of the branches of the lever, a disc, rotatably mounted about a pin integral with the slide, corresponding teeth on the disc and lever, a graduation on the said disc, readable through an opening in the slide, an abutment integral with the slide and against which strikes, at the end of its stroke, the toothed branch of the lever.

5. In a folding photographic apparatus, a slide, a slideway for the slide, a two branch lever pivoted on the slide, an abutment integral with the slideway and acting on one of the branches of the lever, a disc, rotatably mounted about a pin integral with the slide, corresponding teeth on the disc and lever, a graduation on the said disc, readable through an opening in the slide, an abutment integral with the slide and against which strikes, at the end of its stroke, the toothed branch of the lever, means for releasing the slide from its slideway.

6. In a folding photographic apparatus, a slide, a slideway for this slide, a two-branch lever pivoted on the slide, a fork formed at the end of one of the branches, one of the prongs being shorter than the other, an abutment integral with the slideway and normally embraced by this fork, a disc, rotatably mounted about a pin integral with the slide, corresponding teeth on the disc and lever, a graduation on the disc, readable through an opening in the slide, an abutment integral with the slide and against which strikes, at the end of its stroke, the toothed branch of the lever, the shorter upper prong of the fork formed on the other branch of the lever then withdrawing before the abutment of the slideway.

7. In a folding photographic apparatus, a slide, a slideway for this slide, a two-branch lever pivoted on the slide, a fork formed at the end of one of the branches, one of the prongs being shorter than the other, an abutment integral with the slideway and normally embraced by this fork, a disc, rotatably mounted about a pin integral with the slide, corresponding teeth on the disc and lever, a graduation on the disc, readable through an opening in the slide, an abutment integral with the slide and against which strikes, at the end of its stroke, the toothed branch of the lever, the shorter upper prong of the fork formed on the other branch of the lever then withdrawing before the abutment of the slideway, means for bringing back the lever in this position.

8. In a folding photographic apparatus, a slide, a slideway for this slide, a two-branch lever pivoted on the slide, a fork formed at the end of one of the branches, one of the prongs being shorter than the other, an abutment integral with the slideway and normally embraced by this fork, a disc, rotatably mounted about a pin integral with the slide, corresponding teeth on the disc and lever, a graduation on the disc, readable through an opening in the slide, an abutment integral with the slide and against which strikes, at the end of its stroke, the toothed branch of the lever, the shorter upper prong of the fork formed on the other branch of the lever then withdrawing before the abutment of the slideway, a resilient member acting between a fixed point of the slide and the lever, tending to bring back the latter in this position.

In testimony whereof I have signed my name to this specification.

JEAN LOUIS BAILLE.